United States Patent [19]
Cranshoff

[11] Patent Number: 5,596,385
[45] Date of Patent: Jan. 21, 1997

[54] DEVICE FOR OPENING DISPOSABLE CAMERAS AND REMOVING THE FILM ROLL

[76] Inventor: Jan Cranshoff, Stijn Streuvelslaan 22, 2630 Aartselaar, Belgium

[21] Appl. No.: 532,450
[22] Filed: Sep. 22, 1995

[30] Foreign Application Priority Data

Sep. 27, 1994 [BE] Belgium ................... 9400873

[51] Int. Cl.⁶ .................. G03B 13/00; G03B 13/10
[52] U.S. Cl. .................. 396/6; 396/564; 396/538
[58] Field of Search .................. 354/74, 75, 288, 354/297; 206/455

[56] References Cited

U.S. PATENT DOCUMENTS

| | | | |
|---|---|---|---|
| 5,005,035 | 4/1991 | Pagano | 354/206 |
| 5,146,255 | 9/1992 | Nakai et al. | 354/288 |
| 5,285,229 | 2/1994 | Kamata | 354/288 |
| 5,349,410 | 9/1994 | Kamata | 354/288 |

FOREIGN PATENT DOCUMENTS 598393  5/1994  European Pat. Off. ........... 354/297

*Primary Examiner*—D. Rutledge
*Attorney, Agent, or Firm*—William A. Drucker

[57] ABSTRACT

Device for opening disposable cameras comprising a housing and for removing film rolls from them. The device comprises a cutting table, positioning means, a provable knife with respect to the cutting table in order to cut away part of the housing and thus form an opening, means for moving this knife and a mechanism for gripping the film roll through the opening and removing it from the housing.

8 Claims, 3 Drawing Sheets

DEVICE FOR OPENING DISPOSABLE CAMERAS AND REMOVING THE FILM ROLL

BACKGROUND OF THE INVENTION

1. Field of the Invention

The invention relates to a device for opening a disposable camera comprising a housing and for removing a film roll from it. Disposable cameras have a housing, usually made of plastic covered with cardboard, which as such has no provision for being opened. In order to remove the roll of film from the disposable camera the housing must either be broken or a part of the housing must be removed after the removal of the cardboard covering. So far this has been done manually with one or other tool, and is very time-consuming. This poses considerable problems, particularly in industrial processing laboratories where rolls of film must be removed From hundreds of disposable cameras every day.

The purpose of the invention is the provision of a device whereby the opening of the diposable camera and the removal of the film roll can take place in a very simple and fast fashion.

2. Summary of the Invention

According to the invention this object is achieved by the fact that the device comprises a cutting table with associated positioning means, a knife which can be moved with respect to the cutting table in order to cut away part of the housing and thus make an opening, means for moving this knife and a mechanism for gripping the film roll through the opening and withdrawing it from the housing.

The presence of positioning means makes it possible for various types of disposable cameras to be opened by one and the same device.

In a specific embodiment of the invention at least two positioning means are formed by counter knives which are mounted so that they are stationary with respect to the cutting table and work in conjunction with the movable knife during the cutting of the housing.

The cutting edge of the knife is by preference bevelled both in thickness and along its width so that it forms a point on the side against which the housing is positioned and the edge away from the corner of the positioned disposable camera.

An advantageous embodiment of the invention the mechanism which grips the film roll through the opening and removes it from the housing contains a magnet, means for moving this magnet and means for releasing the film roll from the magnet.

BRIEF DESCRIPTION OF THE DRAWINGS

In doing so grateful use is made of the fact that the film spool in disposable cameras is made of metal.

With a view to better illustrating the characteristics of the invention, an embodiment of a device for the opening of the diposable camera and the removal of a film is described in the following by way of example and without in any way being exhaustive and where reference is made to the attached drawings, in which.

DETAILED DESCRIPTION OF THE INVENTION

Figure 1:
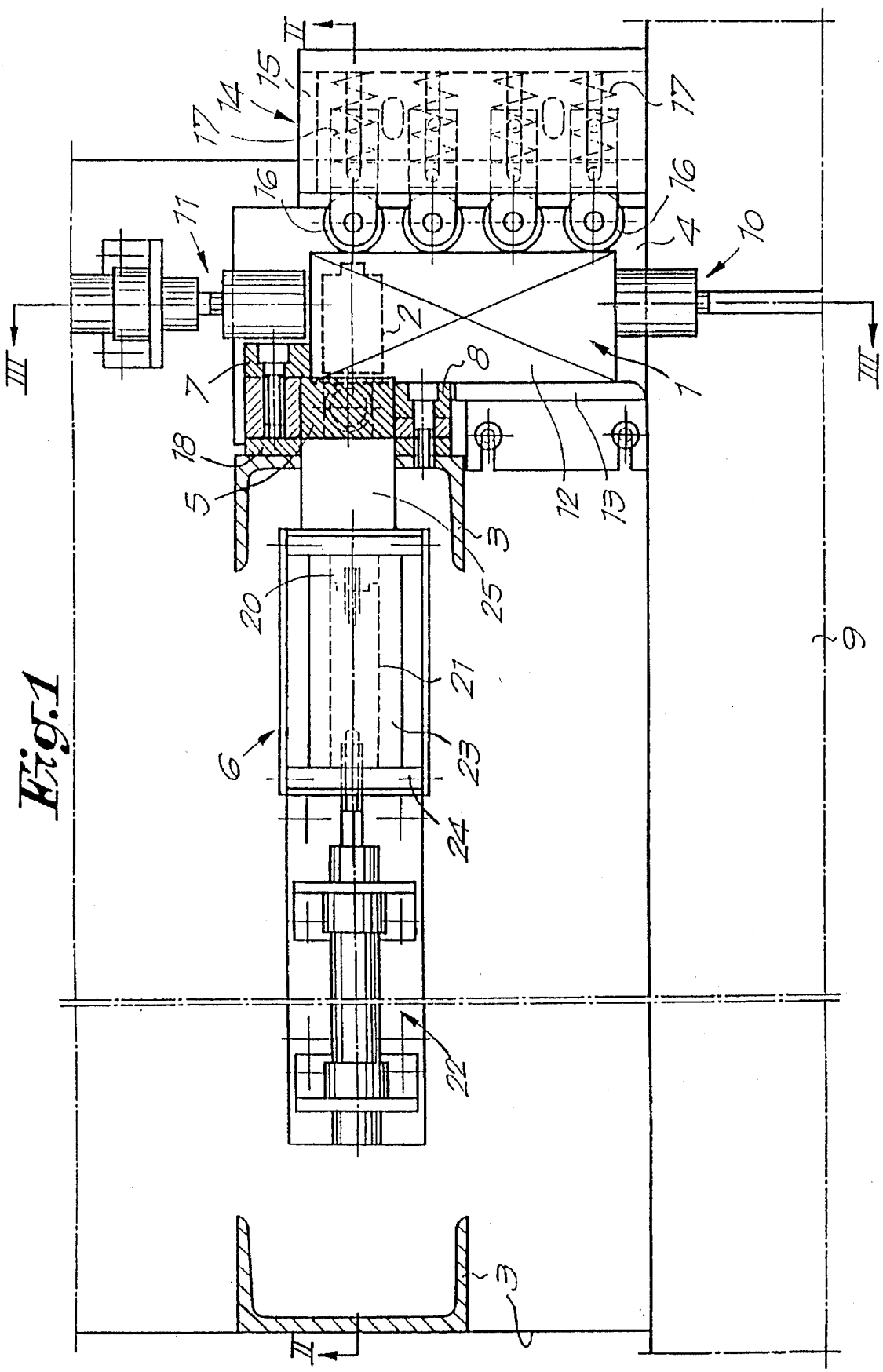
FIG. 1 is a partially cutaway plan view of a device in accordance with the invention.
Figure 2:
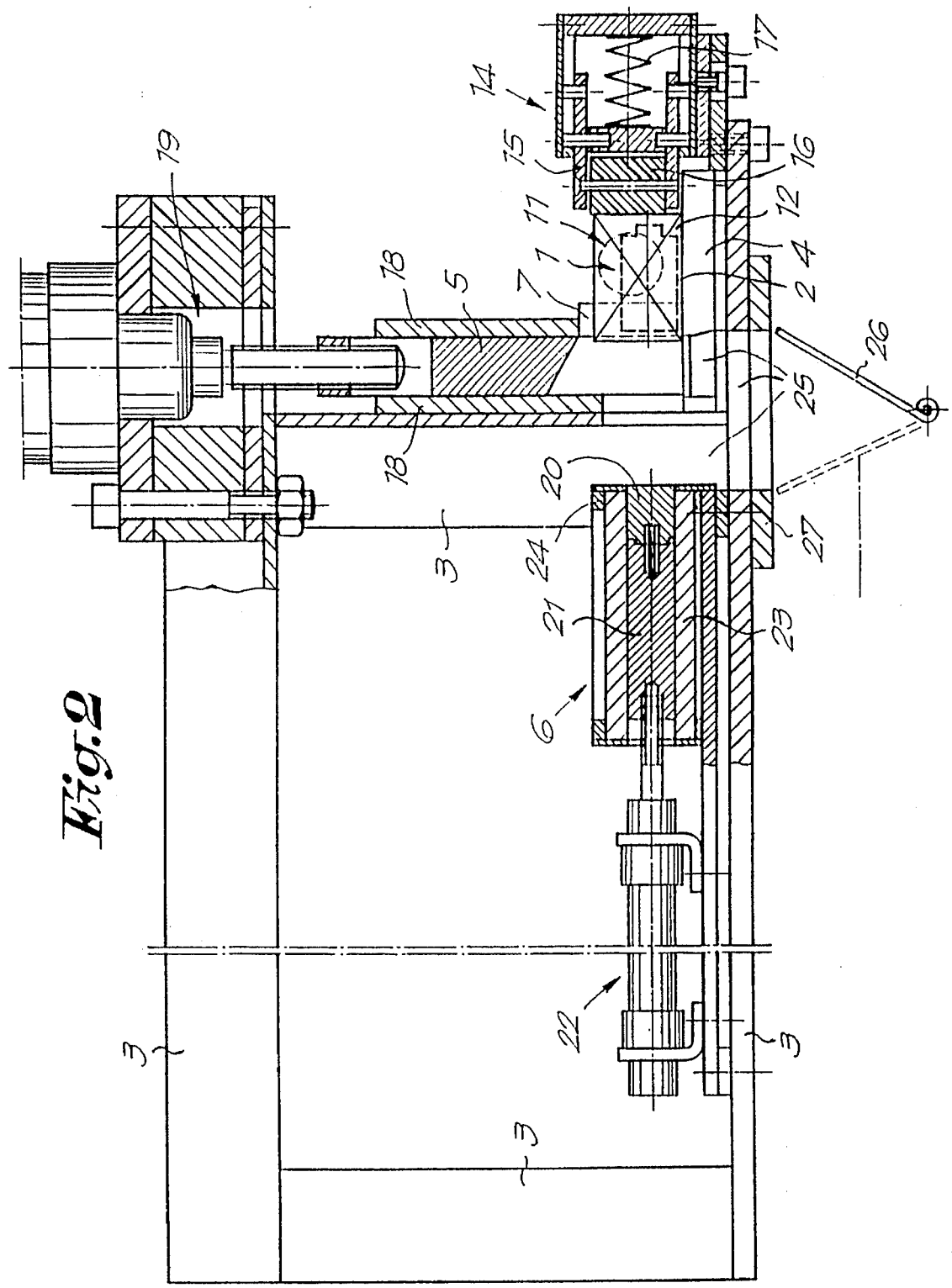
FIG. 2 shows a section along the line II—II in FIG. 1.
Figure 3:
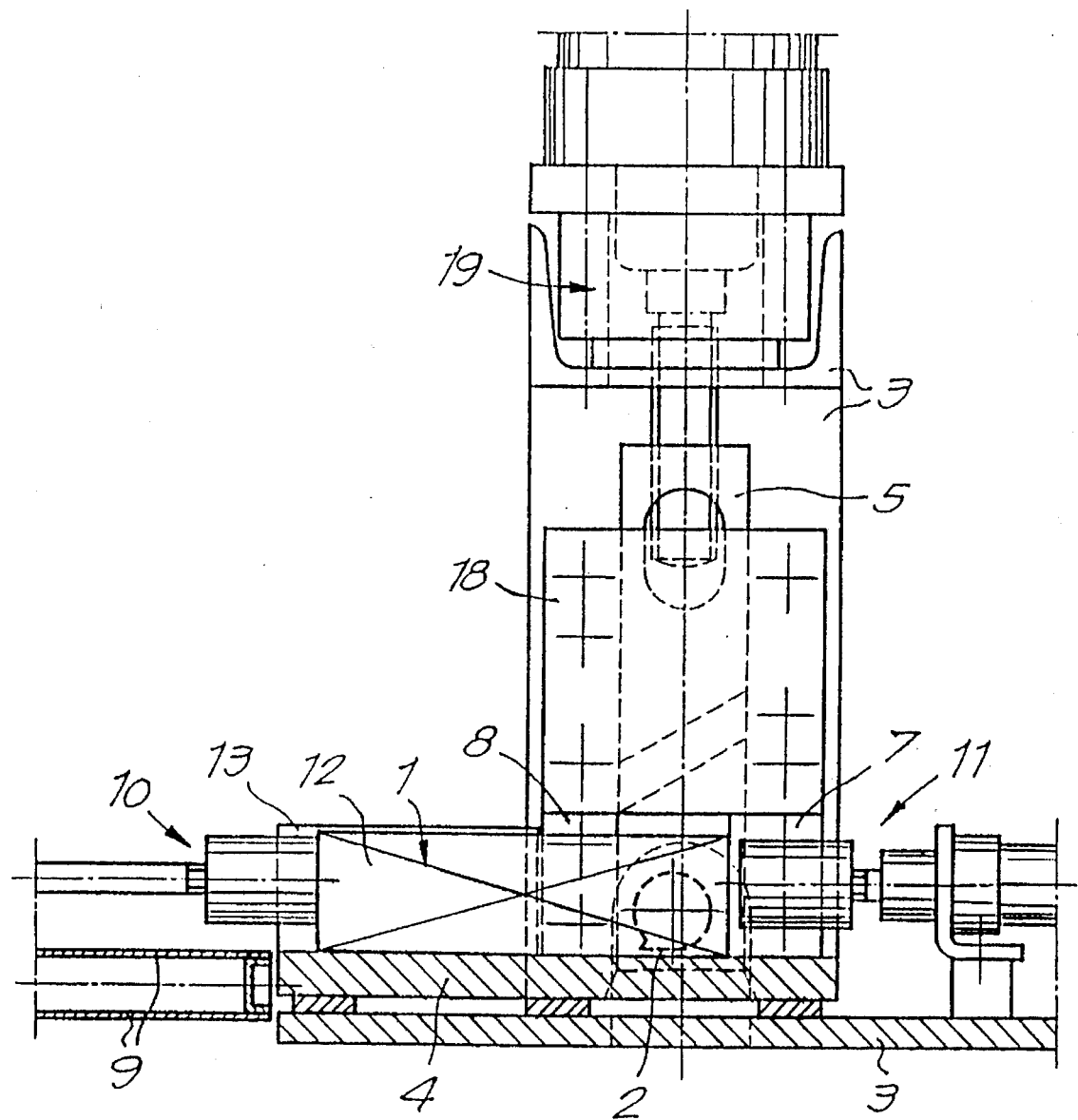
FIG. 3 shows a section along the line III—III in FIG. 1.

The device for the opening of a disposable camera 1 and the removal of a film roll 2 from it, as illustrated in the figures, primarily comprises a chassis 3 with a cutting table 4, a knife 5 which can be moved up and down next to this cutting table and mechanism 6 for gripping and removing the film roll 2.

Positioning means are mounted on the chassis 3 which consist among other things of two counter knives 7 and 8.

The cutting table 4 is a horizontal oblong table. One end of this table lies next to an endless belt 9 the direction of which is perpendicular to the longitudinal direction of the table. This endless belt 9 is continuously driven by a motor which for the sake of simplicity is not shown in the figures.

Two cylinder and piston mechanisms 10 and 11 are located above the cutting table 4 in order place the diposable cameras 1 supplied by the endless belt 9 and to replace them on the same belt after the removal of the film roll 2, one next to each end of the cutting table 4, with the belt 9 lying between one extreme end and the cylinder and piston mechanism 10. Together the endless belt 9 and the cylinder and piston mechanisms 10 and 11 form a supply and removal mechanism for the disposable cameras 1.

The two counter knives 7 and 8 are fastened at an angle of 90° with respect to one another on the chassis 3 so that they respectively form a stop for the short side of the housing 12 of the disposable camera 1 and a stop for a part of one long side located at a distance form the short side.

This means that during the cutting motion of the knife 5 counter knife 7 works in conjunction with the foreside of this knife, this is the side facing the disposable camera 1, while counter knife 8 works in conjunction with the side edge of knife 5 along a line lying at a distance from the front side which is slightly greater than the thickness of the wall of the housing 12.

Consequently when a disposable camera 1 is positioned against the counter knives 7 and 8 knife 5 can cut away part of the longitudinal side wall of the housing 12, namely a part situate opposite the film roll 2 which is located at one extreme end of the disposable camera 1.

Aforementioned positioning is helped by supplementary positioning means, namely a stop 13 which runs next to the counter knife 8 lengthways along the cutting table and which is fastened to the cutting table 4 in such a way that it can be adjusted, and presser element 14. This presser element 14 consists of a holder 15 in which four swivel rollers 16 are spring-mounted around a vertical axis. These rollers 16 are pushed by springs 17 out of the holder 15 against the disposable camera 1, if such is present. The spring-mounting of the rollers 16 means that disposable cameras of various sizes can be positioned.

The knife 5 can be moved up and down between two guides 18 mounted on the chassis, by means of a cylinder and piston mechanism 19. The cutting edge below the knife 5 is bevelled in two directions, namely both across the thickness of the knife and along its width in such a way that the cutting edge on the front and on the side edge which works in conjunction with the counter knife 8 finishes in a point.

The mechanism 6 consists of a magnet 20 which is attached to a cylindrical core 21 which is an extension of the piston rod of a cylinder and piston mechanism 22 horizontally mounted on chassis 3. The core 21 is mounted in a tube 23 located in a supporting structure 24 above the cutting table 4, so that the magnet 20, can be moved under the knife 5 and above the cutting table 4 when the knife 5 is in its uppermost position. At the end of the tube 23, which is turned towards the knife 5, the supporting structure 24, which is located a certain distance from said knife 5, forms a stop for the film roll 2.

An opening 25 remains open between aforementioned end and knife 5 through which a film roll 2 and the cut away part of the housing 12 can fall. A two-position guide baffle 26 is positioned below this opening 25 level with the cutting table 4.

A metal detector 27 is fitted below opening 25.

The cylinder and piston mechanisms 10, 11, 19 and 22 and the drive of the endless belt 9 are controlled by a control unit with a built-in computer in such a way that the unit works as described below. The construction of the control unit is such that it will be known to a person skilled in the art and is not described in detail here.

The disposable cameras 1 from which the film rolls 2, which are spools on which film is wound, must be removed are supplied by the belt 9. This belt positions a disposable camera 1 in the extension of the cutting table 4. This disposable camera 1 is pushed by means of the cylinder and piston mechanism 10 against the counter knives 7 and 8. Furthermore the disposable camera 1 is also positioned by rollers 16 and stop 13.

Next knife 5, which was in its highest position, is pushed downwards by means of cylinder and piston mechanism 19. This knife 5 comes into contact with the upper side of the housing 12 first with the point of the cutting edge at a distance from the short side and at a very small distance, which is slightly greater than the thickness of the wall of the housing from the outside of the longitudinal side wall. Partly as a result of this the disposable camera 1 is held in position during the actual cutting and even pushed against the counter knives 7 and 8.

Upon the further downwards travel of the knife 5 a strip of the housing 12 is cut away so that an opening in the wall is formed opposite the film roll. This strip is pushed away by knife 5 and falls through opening 25 and via the guide baffle 26 into a waste bin.

After cutting knife 5 returns to it uppermost position and the control unit actuates mechanism 6. This causes the cylinder and piston mechanism 22 to slide out and the magnet 20 to be passed through aforesaid opening in the wall of the housing 12 until it comes into contact with the metal spool of the film roll 2. Afterwards the cylinder and piston mechanism 22 is telescoped inwards, with the magnet 20 being withdrawn into the tube 23. The cylinder and piston mechanism 22 pulls the magnet sufficiently deeply into the tube 23 for the film roll, which is held back by the end of the supporting structure 24, so that it loses contact with the magnet 20 and falls through the opening 25.

In the meantime the control unit has moved the guide baffle 26 to its other position so that the film roll 2 falls into another container.

After these operations the cylinder piston mechanism 10 pushes the empty disposable cainera 1 back onto the belt 9 for removal to a waste bin. A new disposable camera 1 is moved by the belt 9 into position opposite the cutting table 4, after which the foregoing cycle can be repeated.

When for one reason or another the film roll 2 cannot be removed from the disposable camera 1, for example because the film was not entirely wound onto the roll, the metal detector 27 will not have recorded the passage of any metal at the end of the cycle. The absence of a detection signal from the metal detector 27 will cause the control device to react and the aforementioned disposable camera 1 will be dealt with by special means.

The device described above makes it possible to open a large number of disposable cameras every hour and to remove their films. This represents an immense time saving on the currently known manual operation.

The invention is by no means restricted to the embodiment described above and illustrated in the figures and such a device can be embodied in a variety of forms without going beyond the scope of the invention as defined in the claims.

In particular the cutting table does not necessarily have to be stationary. It could possibly be movable and form either partially or in whole a supply or removal mechanism for the supply of disposable cameras 1 to the knife 5 and for the opening and removal of diposable cameras 1 after the removal of the film roll 2.

Likewise the means of removing a film roll from of a disposable camera 1 does not necessarily contain a magnet 20. Instead of a magnet other pick-up elements could be used.

I claim:

1. Device for opening disposable cameras having a housing and for removing film rolls from them, comprising a cutting table, positioning means, a movable knife with respect to the cutting table having a cutting edge in order to cut away part of the housing of the disposable camera and to form an opening in it, means for moving this knife, and a mechanism for gripping the film roll through said opening and removing it from the housing of the disposable camera.

2. Device as defined in claim 1, in which at least two of the positioning means are formed by stationary counter knives with respect to the cutting table and acting in conjunction with the movable knife during the cutting of the housing of the disposable camera.

3. Device as defined in claim 2, in which the positioning means comprises a stop for a long side of the housing of the disposable camera and mounted next to a said counter knife, and, opposite a said coutner knife a presser element with a number of spring-mounted rollers for pressing the disposable camera against a said counter knife and the stop.

4. Device as defined in claim 1, in which the cutting edge of the movable knife is bevelled both in the thickness and along the width to form a point on the side against which the housing is positioned and the edge away from a corner of the positioned disposable camera.

5. Device as defined in claim 1, in which the mechanism for gripping the film through the opening in the housing and withdrawing it from the housing comprises a magnet, means for moving this magnet and means for releasing the film roll from the magnet.

6. Device as defined in claim 5, in which between the magnet and means for moving the magnet a core is mounted, the means for releasing the film roll from the magnet contains a supporting structure in which said core is movable and which forms a stop for the film roll.

7. Device as defined in claim 1, in which an opening remains open between the movable knife and the position of the film roll at the time the film roll is released from the magnet, whereby an adjustable guide baffle is located beneath said opening in order to guide, depending on its position, the cut-off part of the housing of the disposable camera and the film roll to different destinations.

8. Device as defined in claim 1, the cutting table is a stationary cutting table and that a supply and removal mechanism is provided for placing the disposable cameras one by one on the cutting table and for removing them from the cutting table after removing the film roll.

* * * * *